(12) United States Patent
Dunn et al.

(10) Patent No.: US 11,275,375 B1
(45) Date of Patent: *Mar. 15, 2022

(54) FIDUCIAL-BASED NAVIGATION OF UNMANNED VEHICLES

(71) Applicant: Amazon Technologies, Inc., Seattle, WA (US)

(72) Inventors: Steven Gregory Dunn, Bothell, WA (US); Carl Ryan Kelso, Seattle, WA (US); Neil Whitney Woodward, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/385,822

(22) Filed: Apr. 16, 2019

Related U.S. Application Data

(63) Continuation of application No. 15/940,829, filed on Mar. 29, 2018, now Pat. No. 10,289,116, which is a continuation of application No. 14/866,760, filed on Sep. 25, 2015, now Pat. No. 9,964,951.

(51) Int. Cl.
| | |
|---|---|
| *G05D 1/00* | (2006.01) |
| *G05D 1/10* | (2006.01) |
| *G08G 5/00* | (2006.01) |
| *B64C 39/02* | (2006.01) |

(52) U.S. Cl.
CPC ......... *G05D 1/0088* (2013.01); *B64C 39/024* (2013.01); *G05D 1/101* (2013.01); *G08G 5/0069* (2013.01); *B64C 2201/128* (2013.01); *B64C 2201/141* (2013.01)

(58) Field of Classification Search
None
See application file for complete search history.

(56) References Cited

U.S. PATENT DOCUMENTS

| | | | | |
|---|---|---|---|---|
| 9,964,951 | B1* | 5/2018 | Dunn | G08G 5/0052 |
| 10,289,116 | B1* | 5/2019 | Dunn | G06K 9/3216 |
| 2012/0327117 | A1* | 12/2012 | Weller | G06T 19/006 |
| | | | | 345/633 |
| 2016/0122038 | A1* | 5/2016 | Fleischman | G05D 1/0676 |
| | | | | 701/2 |
| 2016/0307447 | A1* | 10/2016 | Johnson | B60L 58/12 |
| 2016/0327950 | A1* | 11/2016 | Bachrach | B64C 39/024 |

(Continued)

OTHER PUBLICATIONS

U.S. Appl. No. 14/866,760, "Non-Final Office Action", dated Sep. 5, 2017, 12 pages.

(Continued)

*Primary Examiner* — Anshul Sood
(74) *Attorney, Agent, or Firm* — Kilpatrick Townsend & Stockton LLP

(57) ABSTRACT

Techniques for facilitating an autonomous operation, such as an autonomous navigation, of an unmanned vehicle based on one or more fiducials. For example, image data of a fiducial may be generated with an optical sensor of the unmanned vehicle. The image data may be analyzed to determine a location of the fiducial. A location of the unmanned vehicle may be estimated from the location of the fiducial and the image. The autonomous navigation of the unmanned vehicle may be directed based on the estimated location.

20 Claims, 10 Drawing Sheets

(56) References Cited

U.S. PATENT DOCUMENTS

2017/0011333 A1    1/2017  Greiner et al.
2017/0031369 A1*   2/2017  Liu ...................... B64C 39/024

OTHER PUBLICATIONS

U.S. Appl. No. 14/866,760 , "Notice of Allowance", dated Jan. 19, 2018, 8 pages.
U.S. Appl. No. 15/940,829 , "Non Final Office Action", dated Aug. 27, 2018, 13 pages.
U.S. Appl. No. 15/940,829 , "Notice of Allowance", dated Jan. 18, 2019, 8 pages.

* cited by examiner

FIDUCIAL-BASED NAVIGATION OF UNMANNED VEHICLES

CROSS-REFERENCE TO RELATED APPLICATIONS

This application is a continuation of U.S. Pat. No. 10,289,116, granted May 14, 2019, entitled "FIDUCIAL-BASED NAVIGATION OF UNMANNED VEHICLES," which is a continuation of U.S. Pat. No. 9,964,951, granted May 8, 2018, entitled "FIDUCIAL-BASED NAVIGATION OF UNMANNED VEHICLES," the full disclosure of which is incorporated herein in its entirety.

BACKGROUND

Unmanned vehicles may provide different operations, some of which may be autonomous and support different applications. For example, an unmanned aerial vehicle (UAV) may be used as an autonomous delivery vehicle in association with an electronic marketplace. In particular, the electronic marketplace may offer a large number of items and selectable delivery methods. Based on a selected delivery method, the UAV may be deployed to deliver a purchased item from a source to a destination. The UAV may be configured to autonomously perform various delivery-related operations, such as autonomously flying between the source and the destination.

The unmanned vehicles may rely on different data to perform some of the operations. Referring back to the UAV example, to autonomously fly between the source and the destination, the UAV may use navigation data received from, for instance, a global positioning system (GPS) and/or generated from inertial guidance sensors. In certain situations, the navigation data may become unreliable, and may lead to an improper UAV operation.

BRIEF DESCRIPTION OF THE DRAWINGS

Various embodiments in accordance with the present disclosure will be described with reference to the drawings, in which.

DETAILED DESCRIPTION

Figure 1:
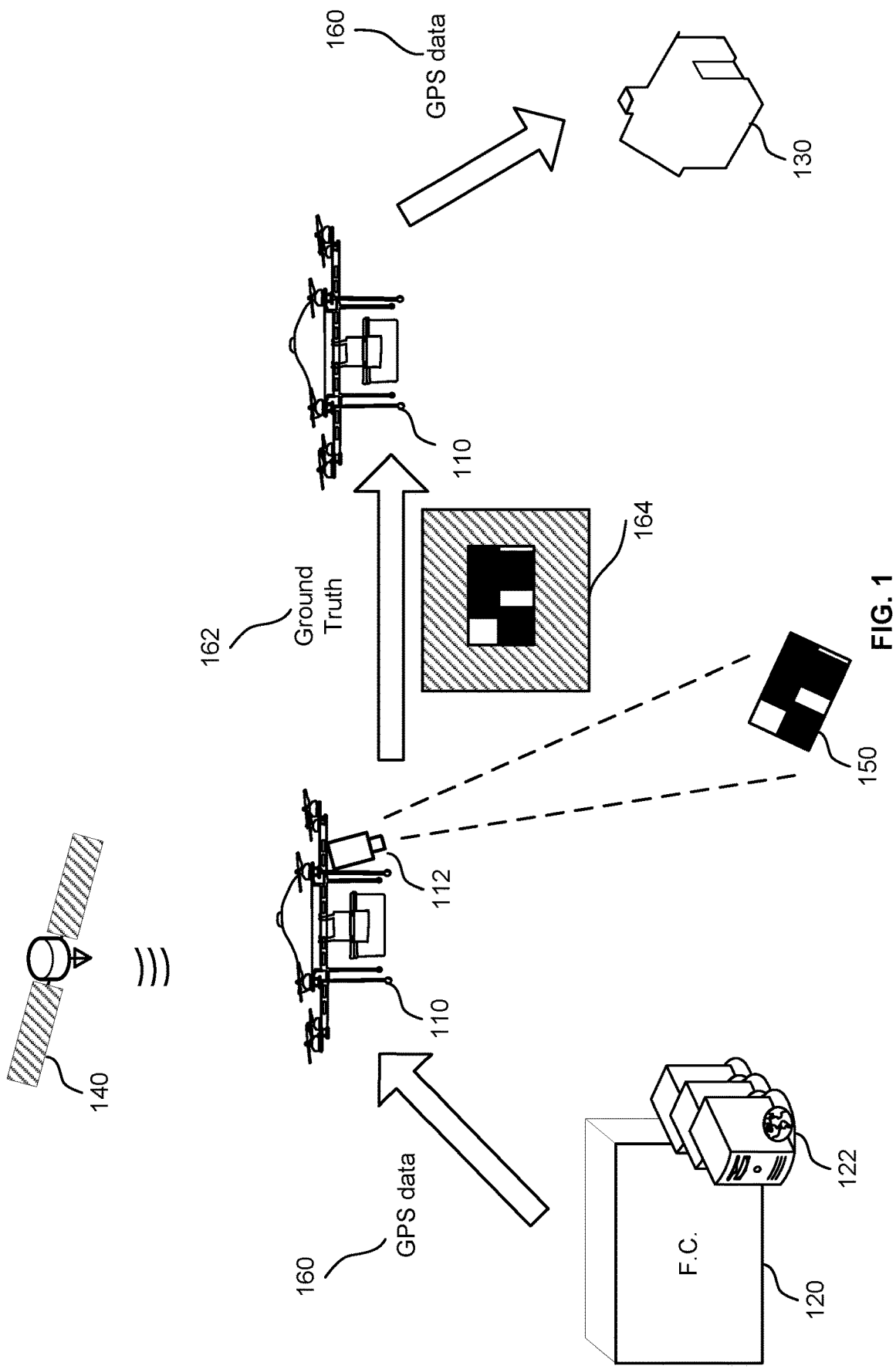
FIG. 1 illustrates an example environment for an autonomous operation of an unmanned vehicle, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, facilitating an autonomous operation of an unmanned vehicle by way of one or more fiducials. In particular, an unmanned vehicle may be configured to perform an autonomous operation, such as a navigation operation. An autonomous operation may represent an operation that may be performed by the unmanned vehicle independently and/or without control of an operator over the operation. To do so, the unmanned vehicle may rely on particular data (e.g., navigation data for autonomous navigation). However, the data may become unreliable or insufficient and/or noise data may be added in certain situations. Accordingly, the autonomous operation may be impacted (e.g., the autonomous navigation may result in navigating the unmanned vehicle to an incorrect location or contacting an undesired obstacle). To mitigate the impact, or even perform the autonomous operation independently of the data, the unmanned vehicle may rely on a set of fiducials. The fiducials may be installed at different locations associated with the autonomous operation and, typically, external to the unmanned vehicle (e.g., at different points of a navigation route). Each fiducial may provide data related to the autonomous operation (e.g., a fiducial may provide location data for a navigation operation). The unmanned vehicle may use data of a fiducial to correct, compensate, or even fully perform the autonomous operation. As such, when other data may become unreliable, insufficient, and/or noisy, the unmanned vehicle may turn to the fiducials to properly perform the autonomous operation.

To illustrate, consider an example of a UAV configured to deliver items offered at an electronic marketplace to a customer-designated location within one or more of a residential neighborhood or an industrial, commercial, or rural zone. The UAV may use GPS data to, for instance, autonomously fly between two locations to complete a delivery. In certain situations, the GPS data may become unreliable (e.g., the UAV may go to some spotty GPS coverage area) and/or its accuracy may become unacceptable (e.g., a thirty feet accuracy, whereas the desired accuracy may be less than three feet). The UAV may also use inertial guidance data from various sensors. However, the accuracy of these sensors may become unacceptable over time and/or various environmental conditions (e.g., wind, atmospheric pressure, etc.) may impact the data reliability. In such situations, the UAV may rely on fiducials installed as waypoints along the route between the two locations. Each fiducial may include a two-dimensional barcode encoding information about its size and location (e.g., latitude, longitude, and true altitude). The UAV may use the fiducials to determine the ground truth (e.g., the actual location of the UAV). To so do, the UAV may capture an image of a fiducial. The image may be analyzed to derive the size and location of the fiducial. Geometric reconstruction may be applied to determine the actual location of the UAV from the size and location of the fiducial. The actual velocity of the UAV may also be determined from multiple images of the same fiducial. As such, the UAV may use the ground truth and the actual velocity to determine offsets to the navigation data (e.g., the GPS and inertial guidance data) and compensate for the offsets. Additionally or alternatively, the UAV may capture multiple images of multiple fiducials along the route to determine the ground truth and velocity over time. This may enable the UAV to fly between the two locations based on the ground truth and velocity data. In other words, the UAV may autonomously fly between the locations by relying partially (e.g., based on the ground truth and velocity data along with some or all of the other navigation data) or fully (e.g., based on the ground truth and velocity data and without the other navigation data) on the fiducials.

In the interest of clarity of explanation, embodiments may be described herein in connection with a GPS-based autonomous flight of a UAV. However, the embodiments are not limited as such. Instead, the embodiments may similarly apply to other navigation data (e.g., inertial guidance data), whether satellite or ground based, and/or to other type of data, whether available from a source internal or external to an unmanned vehicle. The embodiments are also not limited to UAVs and may similarly apply to other types of unmanned vehicles, whether aerial, ground, or water based. The embodiments may also similarly apply to other autonomous operations of unmanned vehicles. Generally, techniques described herein may be implemented to use fiducials and accordingly facilitate an autonomous operation of an unmanned vehicle.

Turning to FIG. 1, the figure illustrates an example environment where data may be available to an unmanned vehicle to perform an autonomous operation. In particular, the figure illustrates a UAV 110 configured to deliver an item from a source 120 to a destination 130. At least a portion of the delivery may include an autonomous navigation (e.g., an autonomous flight). For example, the UAV 110 may autonomously fly between the source 120 and the destination 130. The autonomous navigation (e.g., the flight) may use GPS data. In particular, the UAV 110 may use the GPS data to fly (or, more generally, to navigate) between the source 120 and the destination 130. In addition, the autonomous navigation may also use fiducial data (e.g., data from a set of fiducials). In particular, the UAV 110 may rely on a fiducial 150 for the autonomous navigation. Although a single fiducial 150 is illustrated, a larger number of fiducials may be used as described herein below.

The GPS data may be received from a satellite system 140 and may have a certain accuracy and reliability. However, in certain situations the accuracy may not be acceptable. For example, the accuracy may fall within a range (e.g., up to thirty feet accuracy) that may not support a particular maneuver (e.g., the UAV 110 may be maneuvering around a structure or an obstacle and any navigational error may be critical). Similarly, the reliability of the GPS data may degrade. For example, the coverage of the satellite system 140 may be spotty in certain areas (e.g., inside tunnels), obstructed by different structures (e.g., trees), and/or interfered with from different wireless sources (e.g., wireless networks at particular frequencies). Regardless of the causes or even when the GPS data may be accurate and reliable, the UAV 110 may use the fiducial 150 to assist in the autonomous navigation.

In an example, the source 120 may represent a fulfillment center (F.C.) associated with an electronic marketplace. The fulfillment center may include a warehouse, a storage facility, or some other source from which the item may be available. Generally, the electronic marketplace may offer and facilitate purchases and deliveries of the item (or units thereof) from the source 120. A set of computing resources or systems, such as servers 122, may be configured to facilitate the electronic marketplace. For example, the servers 122 may host an electronic platform for the electronic marketplace. The electronic platform may include a front end system, such as a web site of the electronic marketplace, to offer the item and different delivery methods.

A consumer may use a computing device to interact with the front end system to purchase the item and select a delivery method. The consumer may also provide information, such as location information, about the destination 130. The destination 130 may represent an area or location to which the item should be delivered. The electronic platform may also include a back end system to process orders of the item. For example, the back end system may manage or control the handling of the item in the source 120 and the deployment of the UAV 110 with the item in response to a consumer purchase of the item. As such, the UAV 110 may receive location data related to the source 120 and destination 130, and/or route data (e.g., a flight route) from the servers 122.

Figure 3:
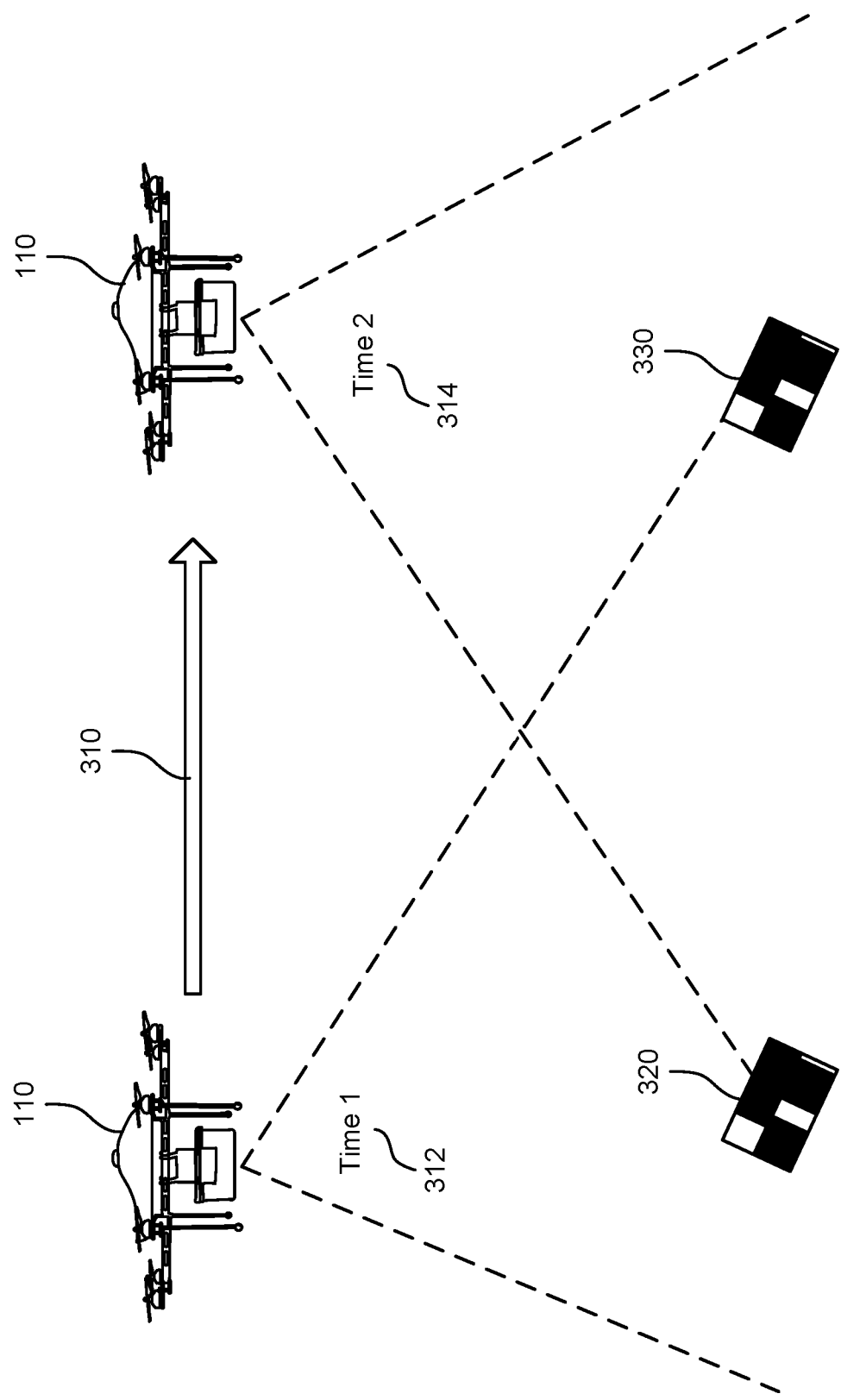
FIG. 3 illustrates an example of using multiple fiducials to determine data related to an autonomous operation, according to embodiments.

The UAV 110 may be deployed from the source 120 to the destination 130 to deliver the item. In an example, the UAV 110 may autonomously navigate between the source 120 and the destination 130. The navigation may include moving, such as flying (or other type of movement for other types of unmanned vehicles), between the two locations. To autonomously navigate, the UAV 110 may rely on navigation data, such as GPS data. However, other types of navigation data may exist and are not illustrated in FIG. 1. For example, a terrestrial wireless network (e.g., cellular, WiFi, or other wireless-based network) may provide navigation data to the UAV 110. In another example, the UAV 110 may also use navigation data available from sensors of the UAV 110. Examples of such sensors are illustrated in FIG. 3.

In the illustrative example of FIG. 1, the UAV 110 may autonomously navigate between the source 120 and the destination 130 using GPS data received from the satellite system 140. For example, a computer system of the UAV 110 may maintain a navigation state of the UAV 110 and may use the navigation state to direct a propulsion system of the UAV 110 according to the prescribed navigation route. In addition, the UAV 110 may use the fiducial 150 to correct, complement, or supplement the GPS data. In particular, the UAV 110 may use the fiducial to determine the UAV ground truth 162 and the UAV actual velocity. The UAV's 110 computer system may use the ground truth and velocity to determine offsets from the GPS data, update the navigation state based on the offsets. In addition, the computer system may replace the GPS data usage with usage of the ground truth and velocity altogether.

The fiducial 150 may represent a unique identifier of a particular location. For example, the fiducial 150 may include a one, two, or higher dimensional marker. In an example, the fiducial 150 may encode information about the dimension and the location of the fiducial 150. In another example, the information may be stored in a data store accessible to the UAV 110 (e.g., in a database local to the UAV 110 or at a storage of the servers 122). Regardless of where the information may reside, the information may facilitate the geometric reconstruction of the ground truth 162 and the determination of the velocity.

Further, a set of fiducials may be located at different locations. Upon deployment of the UAV 110, the servers 122 and/or the UAV 110 may generate a navigation route. The UAV 110 (e.g., the computer system thereof) may access the navigation route to perform the autonomous navigation (e.g., to navigate between the source 120 and the destination 130). The navigation route may identify particular fiducials. As such, the UAV 110 may use the particular UAVs as waypoints to confirm the ground truth 162 and velocity and, accordingly, update the navigation state. In addition, the UAV 110 may use the particular fiducials for the autonomous navigation itself. For example, if the GPS data is too inaccurate, unreliable, or is no longer received, and/or depending on the delivery mission, the UAV 110 may rely on the particular fiducials solely for the autonomous navigation. Depending on the density of the fiducials, the autonomous navigation may continuously use the fiducials or may include dead reckoning (e.g., navigation without additional navigation data, where the UAV may set velocity, direction, and altitude, but may not receive additional navigation data to update the navigation state). For example, if throughout the flight, at least one fiducial is constantly in the field of view of the UAV, the autonomous navigation may continuously use the fiducials. However, if there are some legs of the navigation route where no fiducials are in the field of view of the UAV 110, the autonomous navigation may use dead reckoning during those legs.

To use the fiducials for the autonomous navigation, the UAV 110 may include an imaging device 112 configured to generate images. The imaging device 112 may include a number of optical sensors to capture various image data. For example, the imaging device 112 may represent a camera that may generate black and white, gray scale, color, and/or infrared two and/or three-dimensional images. In an example, the computer system of the UAV 110 may analyze the images using various imaging processing techniques (e.g., object, pattern, and edge recognition techniques) to detect fiducials in the images. The locations and sizes of the detected fiducials may be determined (e.g., from the encoded information in the fiducials or through a data store look up). By applying geometric reconstruction techniques to the images based on the fiducial locations and sizes, the computer system of the UAV 110 may determine the UAV's ground 162 truth and velocity. In another example, the servers 122 may receive the images over a wireless network from the UAV 110, process the received images, and return the ground truth and velocity information to the UAV 110.

As such, the UAV 110 may use the fiducials for the autonomous navigation. Generally, there may be different usages. One exemplary usage may include determining offsets by comparing the ground truth and velocity to the GPS-based navigation data. The offsets may indicate how inaccurate or unreliable GPS data may be. When the accuracy and/or reliability is insufficient (e.g., the offsets exceeding predetermined thresholds), the UAV 110 may correct the navigation state based on the offsets, stop using the GPS data, detect a failure with a GPS receiver, and/or initiate a corrective action (e.g., land immediately, attempt to return to the source 120, enable remote control from the servers, etc.). Another example usage may include compensating for the navigation route. For instance, if the navigation route indicates that the UAV 110 should be at a particular location by a particular time and if the ground truth indicates otherwise, the UAV 110 may manage various UAV components (e.g., a propulsion system) to adjust the velocity and re-align with the navigation route or to update the navigation route itself. Yet another example usage may include using the fiducials to perform the autonomous navigation independently of the GPS data. For instance, the UAV 110 may fly autonomously by using the ground truth and velocity and without using the GPS data.

FIG. 1 illustrates an example autonomous navigation of the UAV 110. As illustrated, the UAV 110 may depart the source 120 on a delivery mission according to a navigation route. The UAV 110 may use GPS data 160 to navigate along the navigation route. At various points of the navigation route, at various time intervals, or continuously, the UAV 110 may request the imaging device 112 to generate images. An image 164 of the fiducial 150 may be captured. That image 164 may be analyzed to determine the ground truth 162. Multiple images of the fiducial 150 may also be captured and analyzed to determine the UAV 110's velocity. The UAV 110 may update its navigation state based on the ground truth 162 and the velocity, determine offsets, compensate for the offsets, and/or update the navigation route. Regardless, the UAV 110 may use the ground truth 162 and the velocity to facilitate the autonomous navigation.

A UAV may autonomously navigate by maintaining a navigation state. The navigation state may include a collection of navigation-related data that may be used to direct the navigation of the UAV. For example, the navigation state may include the latitude, longitude, altitude, and velocity of the UAV over time. The latitude, longitude, and altitude may represent a location of the UAV. A ground truth of the UAV may represent the actual location of the UAV. Thus, the ground truth and, similarly, the UAV's actual velocity may be used to update the navigation state. The ground truth may be determined from one or more images of a fiducial. The actual velocity may be determined from multiple images of the fiducial.

Figure 2:
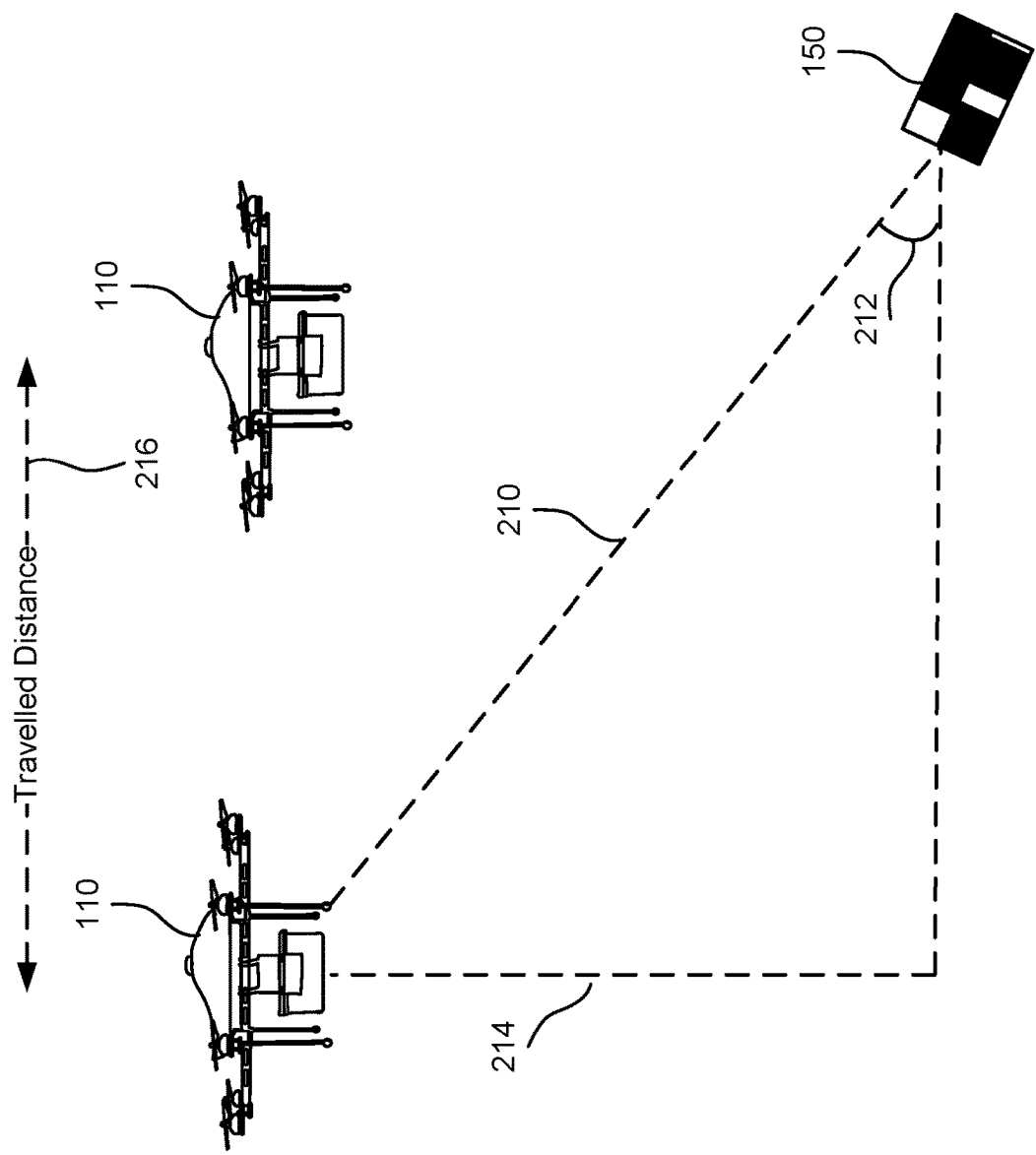
FIG. 2 illustrates an example of using a fiducial to determine data related to an autonomous operation, according to embodiments.

Turning to FIG. 2, the figure illustrates an example technique for determining the ground truth and actual velocity. The example technique may apply a geometric reconstruction based on a location and a size of a fiducial. In particular, the UAV 110 (e.g., the imaging device 112) may generate an image of the fiducial 150 at a time "$t_1$." That image may be analyzed to determine the location and the size of the fiducial 150 (e.g., the fiducial 150 may encode the information, or the fiducial 150 may encode a unique identifier of the fiducial 150 and the unique identifier may be used to look up the location and the size from a data store). The location may include a latitude, longitude, and true altitude of the fiducial 150. The size may include the dimension (e.g., width and length) of the fiducial 150. Based on the image and the size, a scale of the fiducial 150 may be determined relative to the image dimensions. Based on this scale and the relative position of the fiducial 150 within the image, a relative distance 210 between the UAV 110 and the fiducial may be computed. In addition, based on this scale and relative position, an angle 212 in the Y-plane and an angle in the X-plane (not shown in FIG. 2) may be determined. The relative distance 210 and the Y-plane angle 212 may permit a computation of an altitude 214 of the UAV 110 relative to the fiducial 150. Given the true altitude of the fiducial 150, a true altitude (e.g. altitude relative to the sea level) of the UAV 110 may be derived from the altitude 214. In addition, the latitude and longitude of the UAV may be computed from the relative distance 210, the Y-plane angle 212, and the X-plane angle. The latitude, longitude, and altitude of the UAV may form the ground truth.

To compute the velocity of the UAV 110, a second image of the fiducial 150 may be generated at a second time "$t_2$." Similar image analysis may be applied as described herein above, to determine the ground truth of the UAV 110 at the second time "$t_2$." The difference between the ground truth at times "$t_1$" and "$t_2$" may represent a distance 216 travelled between the two times. The velocity of the UAV may be then derived from this travelled distance 216 and times "$t_1$" and "$t_2$."

A UAV may have different usages for the ground truth and velocity. FIG. 3 illustrates an example of compensating a navigation route 310 based on such information. Generally, the navigation route 310 may prescribe a navigation path over time. The navigation route 310 may also identify a number of fiducials that the UAV 110 may be expected to encounter at particular times. These fiducials may represent waypoints of the navigation route 310. For example, a fiducial 320 may be expected to enter a field of view of the imaging device 112 of the UAV 110 at a time "0" 312 while another fiducial 330 may be expected to enter the field of view at another time "$t_2$" 314. If the first fiducial 320 enters the field of view at a different time (e.g., earlier or later than the time "0" 312), that time difference may indicate a time offset, which may also be translated into a distance offset based on the velocity of the UAV 110. These offsets may be used to determine a compensation of the navigation route 210. For example, the velocity of the UAV 110 may be increased such that the second fiducial 330 enters the field of view at the prescribed time "$t_2$" 314, thereby eliminating the time offset. Alternatively or additionally, the navigation path may also change to that effect, thereby eliminating the distance offset. For instance, whereas the navigation route may define an elliptic navigation path, the compensation may specify a direct flat navigation path.

Depending on the density of the fiducials (e.g., the physical distance or separation between the fiducials 320 and 330) and the field of view of the imaging device 112, the UAV 110 may use the fiducials to perform the autonomous navigation independently of the GPS data.

As illustrated in FIG. 3, along the navigation route 310, the field of view 410 may include at least one fiducial at any time between times "0" 312 and "$t_2$" 314. Thus, the autonomous navigation between those times may be performed continuously based on the fiducials 320 and 330 and independently of the GPS data. In comparison, if for a certain period of time, no fiducial was in the field of view, the UAV 110 may fly blindly (e.g., dead reckoning) or may revert back to using the GPS data.

Figure 4:
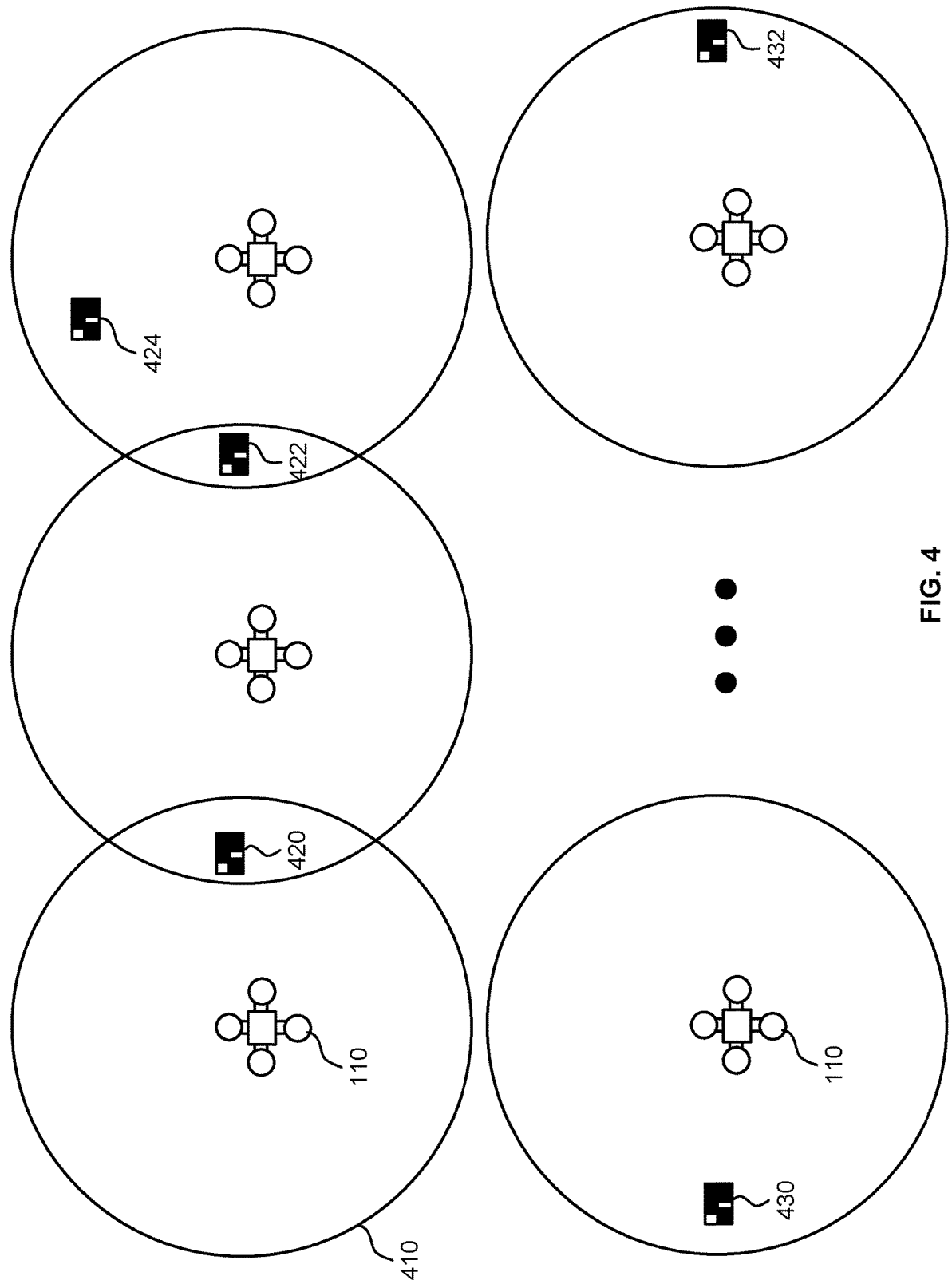
FIG. 4 illustrates examples of using fiducials for different autonomous operations, according to embodiments.

Turning to FIG. 4, the figure further illustrates how the UAV 110 may use fiducials to fully or partially perform the autonomous navigation. The top part of FIG. 4 illustrates a top perspective of the full autonomous navigation, while the bottom part of FIG. 4 illustrates a top perspective of the partial autonomous navigation.

In particular, the imaging device 112 of the UAV 110 may have a field of view 410, illustrated as a circular projection on the ground. Under the full autonomous navigation, the field of view 410 may include at least a fiducial at any point in time along the navigation route. As such, for a certain time period, the UAV 110 may encounter a fiducial 420. For a next time period, the UAV 110 may encounter the fiducial 420 and an additional fiducial 422. For a subsequent time period, the UAV 110 may encounter the fiducial 422 and another fiducial 424 but not the initial fiducial 424. After that time period, the UAV 110 may encounter the fiducial 424 but not the second fiducial 422. As such, across the time periods, the UAV 110 may encounter at least one of the fiducials 420-424 and may derive and use the UAV 110's ground truth and velocity to autonomously navigate independently of the GPS data. When multiple fiducials are encountered simultaneously (e.g., the fiducials 420 and 422 in the second time period), the accuracy of the ground truth and velocity may be improved. Thus, additional benefits may be achieved with a higher density of fiducials.

In comparison, the partial autonomous navigation may include blind spots. A blind spot may represent an area or a leg of the navigation route where the UAV 110 may not encounter a fiducial (e.g., no fiducials may be in the field of view 410 of the imaging device 112). Thus, the UAV 110 may use dead reckoning techniques or revert back to using GPS data (or other navigation data from other UAV sensors) to perform the autonomous navigation. As illustrated, the UAV 110 may encounter a fiducial 430 and may use the resulting ground truth and velocity for a period of time. However, once the fiducial 430 exists the field of view 410 and no other fiducial enters the field of view 410, the UAV 110 may no longer determine the ground truth and velocity based on the fiducials. This may remain the case until another fiducial 432 enters the field of view 410. At that point in time, the UAV may rely on the fiducial 432 for the autonomous navigation. In this example, the UAV 110 may fly blindly for some time between the fiducials 430 and 432.

The blind autonomous navigation may be achieved in different ways using dead reckoning techniques. In an example, the navigation route may identify the fiducials 430 and 432 and the distance between the two. In another example, the information associated with (e.g., encoded in) the fiducial 430 may identify the next fiducial 432 including the fiducial 432's location. Accordingly and in both examples, the UAV 110 may set a flight path (e.g. certain direction at a certain altitude) and a velocity to move in the blind spot. Once proximate to the boundary of the blind spot, the UAV 110 may activate or request the imaging device 112 to start generating images such that the fiducial 432 may be detected. Once the fiducial 432 is detected, the UAV 110 may determine the ground truth and velocity based the fiducial 432, may determine errors to assumed location and velocity, and may update the navigation state to offset the errors.

To illustrate, the fiducials 430 and 432 may be ten miles apart in a certain direction. The UAV 110 may set its velocity and direction to arrive to the location of the fiducial 432 within a particular timeframe after departing from the location of the fiducial 430 (e.g., twenty miles per hour to fly for thirty minutes). Near the end of the timeframe, the imaging device 112 may generate images to detect the fiducial 432. Upon detection, the UAV 110 may determine its ground truth and velocity given the fiducial 432. If this determination indicates certain distance and/or orientation deviations (e.g., short by half a mile), the UAV 110 may update its navigation state accordingly. For instance, a deviation may be caused by various parameters such as wind, drift, and/or inaccuracies of inertial guidance sensors. The UAV 110 may use detected deviations to compensate for the various parameters.

Figure 5:
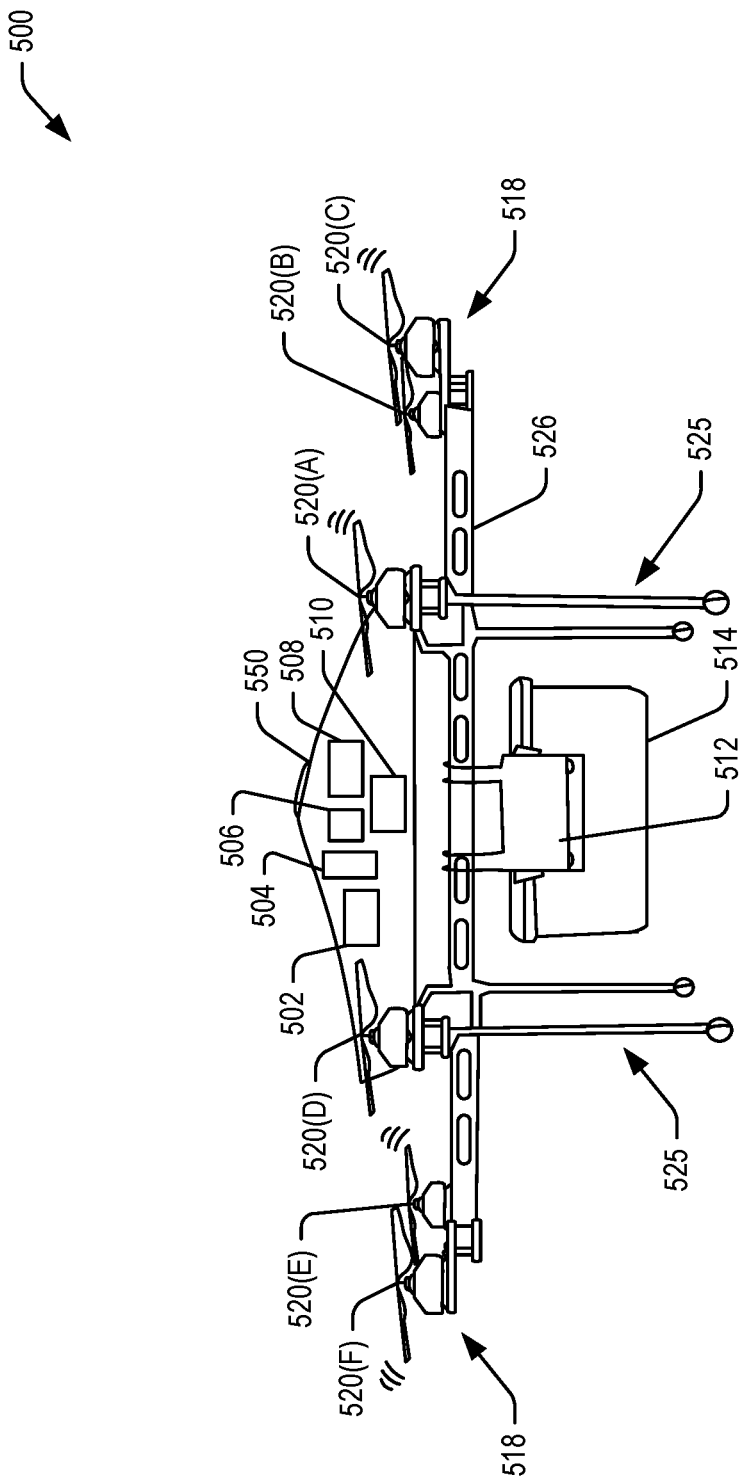
FIG. 5 illustrates an example unmanned vehicle configuration, according to embodiments.

To use fiducials and determine ground truth and velocity, a UAV may rely on a combination of a computer system, optical sensors, and network interfaces. FIG. 5 illustrates an example configuration of a UAV 500 with such components. In particular, the UAV 500 may be configured to deliver an item. The UAV 500 may perform an autonomous operation associated with the delivery. For example, the autonomous operation may include an autonomous flight from a source storing the item to a destination receiving the item.

The UAV 500 may be designed in accordance with commercial aviation standards and may include multiple redundancies to ensure reliability. In particular, the UAV 500 may include a plurality of systems or subsystems operating under the control of, or at least partly under the control of, a management system 502. The management system 502 may include an onboard computer system hosting a management module for autonomously or semi-autonomously controlling and managing various operations of the UAV 500 and, in some examples, for enabling remote control from a central station. The various operations may include managing other components of the UAV 500, such as a propulsion system 518 to facilitate flights. Portions of the management system 502, including the onboard computer system, may be housed under top cover 550. The top cover may also include a power supply and assemblies (e.g., rechargeable battery, liquid fuel, and other power supplies) (not shown) to facilitate operation of the UAV 500.

In addition, the UAV may include a number of navigation devices, sensors, antennas, communication links, and other systems to aid in navigating the UAV 500. Such components may also be housed under the top cover 550. In an example, a GPS receiver 504 may be installed. GPS data received by the GPS receiver from a source external to the UAV 500 may be sent over a data bus to the management system 502. In turn, the management system 502 may generate a navigation state based on the GPS data and accordingly direct various components to perform autonomous operations of the UAV 500 including, for example, an autonomous flight. Further, additional navigation sensors 506 may be installed under the top cover 550. The navigation sensors 506 may include by way of example an electromagnetic compass, a gyroscope, an accelerometer, an altimeter, a barometric pressure sensor, and/or other navigational components (e.g., components related to an inertial navigation system (INS), a range finder, and/or Radio Detection And Ranging (RADAR)). Sensor data (e.g., navigation-related data generated by such sensors 506) may be sent to the management system 502 over a same or different data bus. Similarly to processing the GPS data, the management system 502 may process this locally generated sensor data to update the navigation state and direct the autonomous operations of other components.

Optical sensors 508 may also be installed under the top cover 550. In an example, one or more optical sensors may be components of an imaging device (e.g., an imaging device) attached to or integrated with the UAV 500. The imaging device may be tilted in different directions to capture images of, for example, a surface under, on the side, or over the UAV 500. If the imaging device is statically affixed and cannot be tilted, the management system 502 may orient the UAV 500 to capture images over these different directions. Captured images may be of different resolution or of different types. For example, the management system 502 may request a particular image resolution or an infrared image. The imaging device may accordingly generate such image by activating the proper optical sensors and send the image (e.g., the resulting image data) to the management system 502.

Further, a network interface 510 may be installed under the top cover 550. The network interface may include, for example, a wireless network card or wireless network port that may facilitate communication between the UAV 500 (e.g., the management system 502) and one or more external resources (e.g., central stations, other UAVs, etc.) over a network. The network interface 510 may accordingly enable one or more wireless communications links and antennas (e.g., modem, radio, network, cellular, satellite, and other links for receiving and/or transmitting information) from and to these external resources. As such, the interface 510 may include high speed interfaces, wired and/or wireless, serial and/or parallel, to enable fast upload and download of data to and from the computer system 504. In an example, the network interface 510 may include 802.11 interfaces, 802.16 interfaces, Bluetooth interfaces, near field communication interfaces, cellular interfaces, and/or satellite interfaces for download and upload of data.

As shown in FIG. 5, the UAV 500 may also include a retaining system 512. The retaining system 512 may be configured to retain payload 514. In some examples, the retaining system 512 may retain the payload 514 using friction, vacuum suction, opposing arms, magnets, and other retaining methods. As illustrated in FIG. 5, the retaining system 512 may include two opposing arms (only one is illustrated) configured to retain the payload 514. In an example, the payload 514 may include an item ordered from an electronic marketplace. The management system 502 may be configured to control at least a portion of the retaining system 512. In some examples, the retaining system 512 may be configured to release the payload 514 in one of a variety of ways. For example, the retaining system 512 (or other system of the UAV 500) may be configured to release the payload 514 with a winch and spool system, by the retaining system 512 releasing the payload, by fully landing on the ground and releasing the retaining system 512, and other methods of releasing the payload 514. In some examples, the retaining system 512 may operate semi-autonomously or autonomously.

Further, the UAV 500 may include a propulsion system 518. In some examples, the propulsion system 518 may include rotary blades or otherwise be a propeller-based system. As illustrated in FIG. 5, the propulsion system 518 may include a plurality of propulsion devices, a few of which, 520(A)-520(F), are shown in this view. Each propeller device may include one propeller, a motor, wiring, a balance system, a control mechanism, and other features to enable flight. In some examples, the propulsion system 518 may operate at least partially under the control of the management system 502. In some examples, the propulsion system 518 may be configured to adjust itself without receiving instructions from the management system 502. Thus, the propulsion system 518 may operate semi-autonomously or autonomously.

The UAV 500 may also include landing structure 525. The landing structure 525 may be adequately rigid to support the UAV 500 and the payload 514. The landing structure 525 may include a plurality of elongated legs that may enable the UAV 500 to land on and take off from a variety of different surfaces. The plurality of systems, subsystems, and structures of the UAV 500 may be connected via frame 526. The frame 526 may be constructed of a rigid material and be capable of receiving via different connections the variety of systems, sub-systems, and structures. For example, the landing structure 525 may be disposed below the frame 526 and, in some examples, may be formed from the same material and/or same piece of material as the frame 526. The propulsion system 518 may be disposed radially around a perimeter of the frame 526 or otherwise distributed around the frame 526. In some examples, the frame 526 may attach or be associated with one or more fixed wings.

Figure 6:
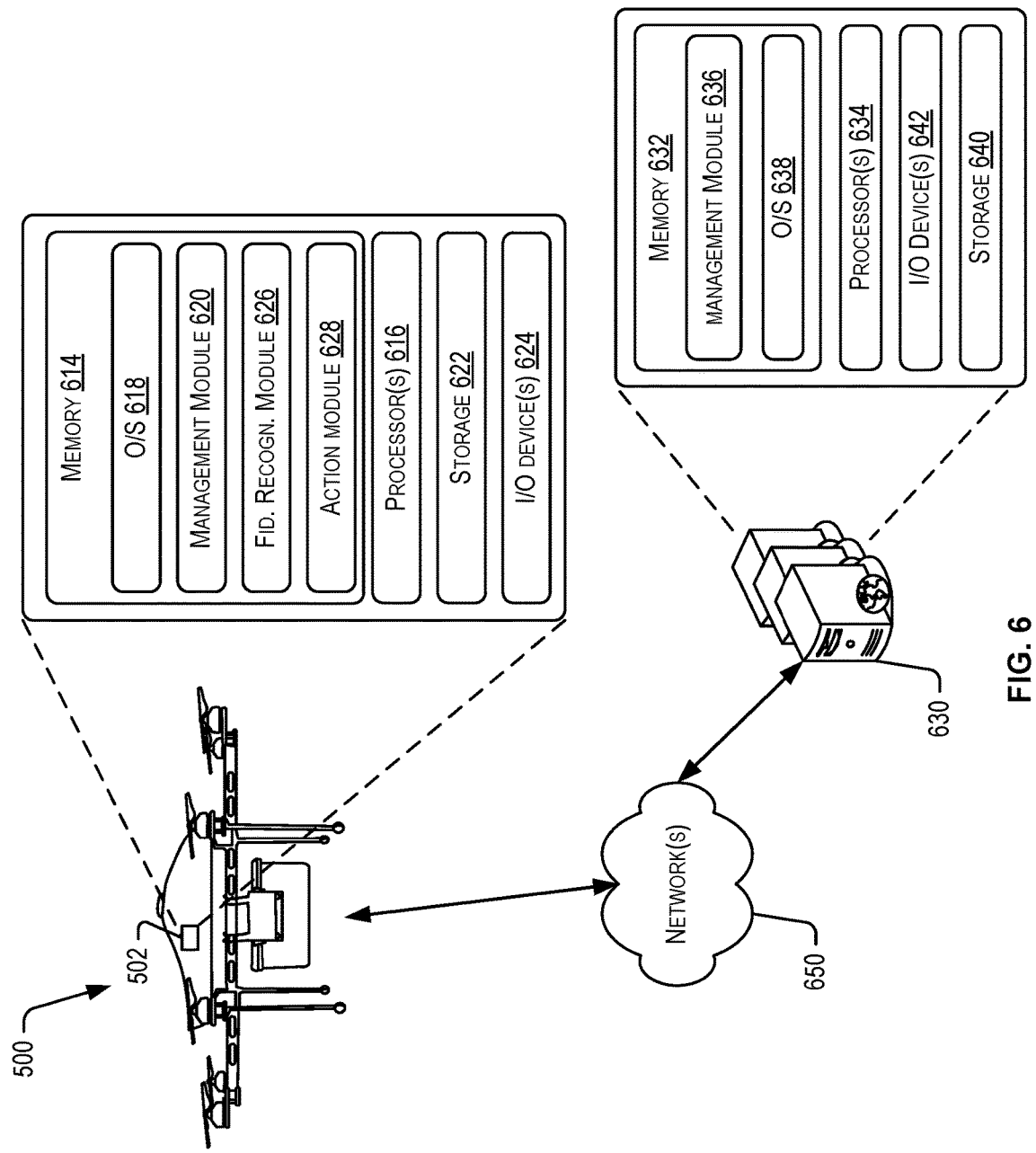
FIG. 6 illustrates an example computing architecture that may include an unmanned vehicle and a remote computing resource, according to embodiments.

The UAV 500 may locally process images generated by the imaging device to identify fiducials and accordingly determine the ground truth and velocity. Additionally or alternatively, the UAV 500 may be in communication with a central station over a wireless data network for various reasons. In an example, the central station may provide navigation route information to the UAV 500. In another example, the UAV 500 may enable remote controls to the central station (e.g., as a corrective action when performing an autonomous navigation may not be proper). In yet another example, the processing of the images and determination of ground truth and velocity may be distributed between the UAV and the central station. FIG. 6 illustrates an example configuration where the UAV 500 may be in communication with a central station 630 over a data network 650.

In an example, the central station 630 may be in communication with the UAV 500 to facilitate a delivery of an item ordered from the electronic marketplace. This communication may occur over the data network 650. The data network 650 may include any one or a combination of many different types of networks, such as wireless networks, cable networks, cellular networks, satellite networks, radio networks, the Internet, and other private and/or public networks. Facilitating the delivery may include selecting the UAV 500 for deployment, providing flight route information as part of the deployment, deploying the UAV 500, monitoring the flight of the UAV 500, exchanging information about fiducials, and/or providing remote controls over certain operations of the UAV 500 (e.g., as a corrective action as needed).

Turning now to the details of the central station 630, the central station 630 may include or be hosted on one or more service provider computer systems, such as servers and other suitable computing devices, configured to offer various services to users. Such computer systems may be configured to host a web site (or combination of web sites) accessible to customers. The web site may be accessible via a web browser and may enable a customer to place an order for an item.

In embodiments, the central station 630 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the central station 630 may be hosted on one or more servers, perhaps arranged in a cluster, or as individual servers not associated with one another.

In one illustrative configuration, the central station 630 (or the hosting computer system) may include at least one memory 632 and one or more processing units (or processor (s)) 634. The processor(s) 634 may be implemented as appropriate in hardware, computer-executable instructions, software, firmware, or combinations thereof. Computer-executable instruction, software, or firmware implementations of the processor(s) 634 may include computer-executable or machine-executable instructions written in any suitable programming language to perform the various functions described. The memory 632 may include more than one memory and may be distributed throughout a plurality of a network of servers. The memory 632 may store program instructions (e.g., a management module 636) that are loadable and executable on the processor(s) 634, as well as data generated during the execution of these programs. Depending on the configuration and type of memory, the memory 632 may be volatile (such as random access memory (RAM)) and/or non-volatile (such as read-only memory (ROM), flash memory, or other memory).

The central station 630 (or the hosting computer system) may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 632 may include multiple different types of memory, such as static random access memory (SRAM), dynamic random access memory (DRAM), or ROM.

Turning to the contents of the memory 632 in more detail, the memory 632 may include an operating system 638 and one or more application programs, modules or services for implementing the features disclosed herein including at least the management module 636. The management module 636, in some examples, may support, direct, manage, and/or control operations of some or all of the components of the UAV 500. For instance, the management module 636 may transmit data associated with a delivery of an item to the UAV 500. Such data may include flight route information (e.g., source location, destination location, flight path, fiducial waypoints along the path, etc.) and may be used by the UAV 500, such as by the management system 502 thereat, to deliver the item. Furthermore, the management module 636 may be used to select and deploy the UAV 500 on a delivery mission. The management module 636 may also receive data from the UAV 500 during the deployment and/or execution of the delivery mission. The management module 636 may process that data and provide, as applicable, further instructions to the UAV 500 to adjust the flight route, perform a corrective action, or adjust the delivery of the item.

In an example, the management module 636 may receive images of fiducials or identifiers of fiducials from the UAV 500 and may, in response, determine locations and sizes of the fiducials and/or location and velocity of the UAV 500 and return such data to the UAV 500. In this case, the central station 630 may have access to (e.g., store locally or connect to a remote data store) associations between fiducials and the respective locations and sizes. For instance, the management module 636 may maintain a map of such fiducials. Over time, the central stations may receive images of fiducials from multiple UAVs and, optionally, the UAV locations determined from the images. The management module 636 may analyze the images to determine if a fiducial should be discredited. For example, if images show that a portion of a fiducial has been obstructed by an object, the management module 636 may generate instructions to remove the object or replace the fiducial. In another example, if the received locations of the UAVs are inconsistent with the location of a respective fiducial, the management module 636 may similarly discredit the fiducial and generate instructions to mitigate the potential cause of the discredit.

In some examples, the central station 630 (or the hosting computer system) may also include additional storage 640, which may include removable storage and/or non-removable storage. The additional storage 640 may include, but is not limited to, magnetic storage, optical disks, and/or tape storage. The disk drives and their associated computer-readable media may provide non-volatile storage of computer-readable instructions, data structures, program modules, and other data for the computing devices.

The memory 632 and the additional storage 640, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computer systems (e.g., processors). The modules of the central station 630 may include one or more components. The central station 630 may also include I/O device(s) and/or ports 642, such as for enabling connection with a keyboard, a mouse, a pen, a voice input device, a touch input device, a display, speakers, a printer, or other I/O device.

FIG. 6 further illustrates components of the management system 502 of the UAV 500. The management system 502 may include a management component implemented, in part or in full, by the computer system. The computer system may include at least one memory 614 and one or more processing units (or processor(s)) 616. The processor(s) 616 may be implemented as appropriate in hardware, computer-executable instructions, software, firmware, or combinations thereof. Computer-executable instruction, software, or firmware implementations of the processor(s) 616 may include computer-executable or machine-executable instructions written in any suitable programming language to perform the various functions described. The memory 614 may include more than one memory and may be distributed throughout the computer system 502. The memory 614 may store program instructions (e.g., a management module 620) that are loadable and executable on the processor(s) 616, as well as data generated during the execution of these programs. Depending on the configuration and type of memory, the memory 614 may be volatile (such as random access memory (RAM)) and/or non-volatile (such as read-only memory (ROM), flash memory, or other memory).

The computer system may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 614 may include multiple different types of memory, such as static random access memory (SRAM), dynamic random access memory (DRAM), or ROM.

In some examples, the computer system may also include additional storage 622, which may include removable storage and/or non-removable storage. The additional storage 622 may include, but is not limited to, magnetic storage, optical disks, and/or tape storage. The disk drives and their associated computer-readable media may provide non-volatile storage of computer-readable instructions, data structures, program modules, and other data for the computing devices.

The memory 614 and the additional storage 622, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computer system may include one or more components.

Turning to the contents of the memory 614 in more detail, the memory 614 may include an operating system 618 and one or more application programs, modules or services for implementing the features disclosed herein including at least the management module 620. The management module 620 may be configured to provide flight operation management functions and/or to manage operations of different components to deliver an item. In an example, the management module 620 may operate autonomously or independently of the management module 636 of the central station 630. In another example, the management module 620 may operate semi-autonomously or be fully controlled by the management module 636.

The memory 614 may also include a fiducial recognition module 626. The fiducial recognition module 626 may be configured to analyze images generated from the imaging device of the UAV 500, identify fiducials, and determine the ground truth and velocity of the UAV 500.

The fiducial recognition module 626 may locally analyze the images and apply geometric reconstruction. In another example, the fiducial recognition module 626 may provide image data to the management module 636 of the central station 630 that would return data about the fiducials and/or about the ground truth and UAV location.

Further, the memory 614 may include an action module 628. The action module 628 may specify actions to be performed in association with autonomous operations of the UAV based on the fiducials. For example, the action module 628 may specify whether navigation data offsets should be computed, navigation routes should be compensated, and/or autonomous navigation should be fully or partially performed using the fiducials. In addition, the action module 628 may also define various corrective actions. Some of the corrective actions may apply when the navigation data offsets exceed a threshold. For example, the corrective actions may include increasing the rate or frequency of generating images of expected fiducials, mainlining course, adjusting velocity, landing the UAV 500, attempting to return the UAV to a home base, aborting a delivery mission, reporting the offsets to the central station 630, and/or enabling remote control from the central station 630.

The computer system may also include I/O device(s) 624 (e.g., interfaces, ports) such as for enabling connection with the central station 630. The I/O device(s) 624 may also enable communication with the other components and systems of the UAV 500 (e.g., a propulsion system, GPS receiver, navigation sensors, optical sensors, etc.).

Figure 7:
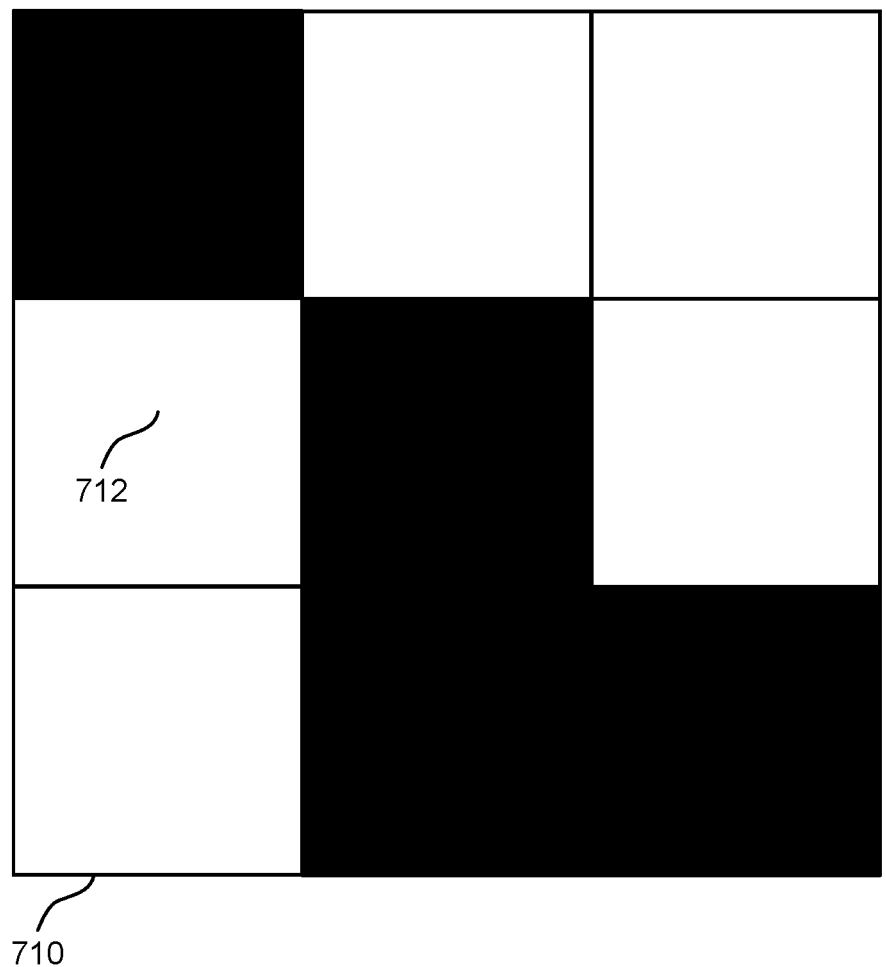
FIG. 7 illustrates an example fiducial, according to embodiments.

A UAV may rely on a fiducial to determine the UAV's ground truth and velocity. To facilitate this determination, the fiducial may encode various information, such as the fiducial's location and dimensions. FIG. 7 illustrates an example of such a fiducial 710. In particular, the fiducial 710 may represent a multi-dimensional marker, such as a two dimensional barcode. As illustrated, the fiducial 710 may include a grid of black and white tiles 712. A three-by-three grid is shown, however a different grid configuration may be used. Each tile 712 may encode or represent a bit of information. As such, a three-by-three fiducial may encode nine bits of information.

Other shapes and sizes of the fiducial 710 may be used. For example, the fiducial 710 may be rectangular or circular. Further, the fiducial 710 need not be black and white, but may include different colors, patterns, and/or textures. However, a black and white fiducial may simplify the image processing and the needed image capabilities of the UAV.

In addition, the fiducial 710 may be a printed element (e.g., a sticker, a plaque, etc.) or a painted element (e.g., a painted grid on a top of a building) of proper dimensions. The dimensions may depend on the capabilities of the imaging device of the UAV.

In an example, the fiducial 710 may be static (e.g., installed in a static location) or may be movable (e.g., installed on a movable structure). In addition, the information encoded in the fiducial 710 may be static (e.g., encoded once and no longer updated) or dynamic. To illustrate an example of dynamic information, the fiducial 710 may include a display connected to a computing device and/or a number of sensors (e.g., environmental sensors such as barometric and temperature sensors). The information may be updated over time and presented at the display. For instance, this information may include barometric pressure temperature detected by the sensors and/or received by the computing device from another source (e.g., a weather web site). This type of information may allow the UAV to, for example, compute the UAV's altitude based on the information and similar information sensed by corresponding sensors of the UAV.

Figure 8:
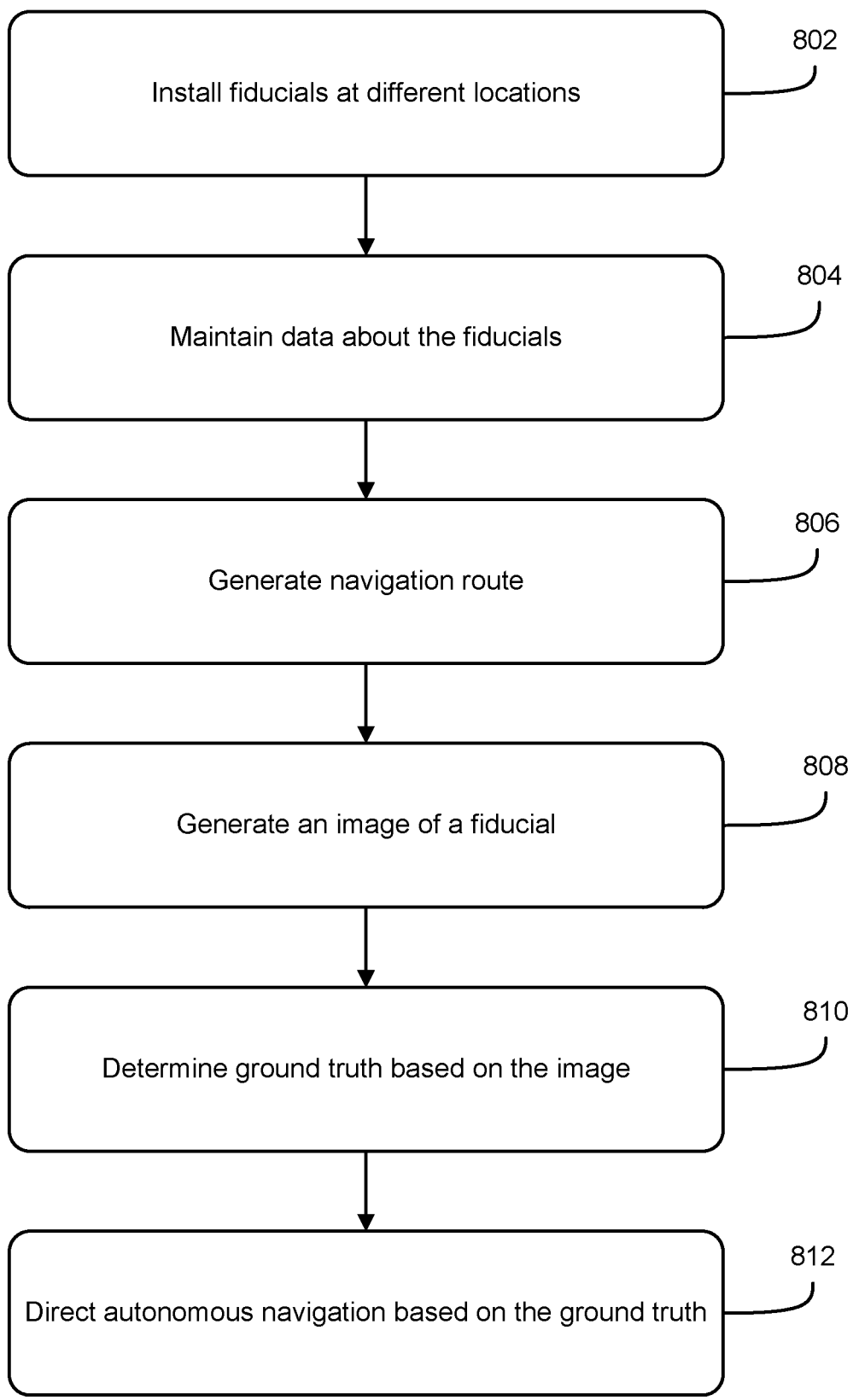
FIG. 8 illustrates an example flow for using a fiducial for an autonomous operation, according to embodiments.
Figure 9:
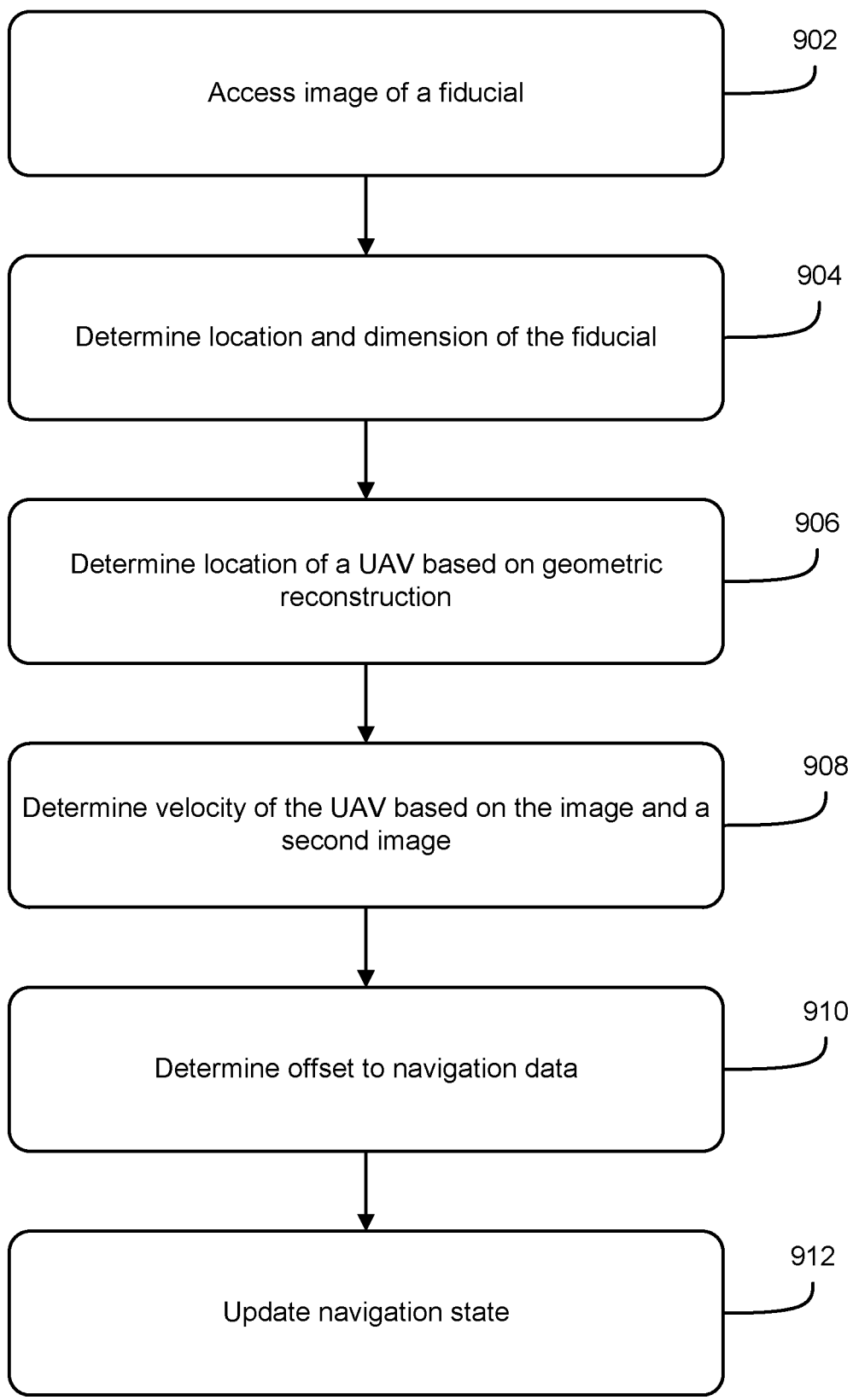
FIG. 9 illustrates another example flow for using a fiducial for an autonomous operation, according to embodiments.
Figure 10:
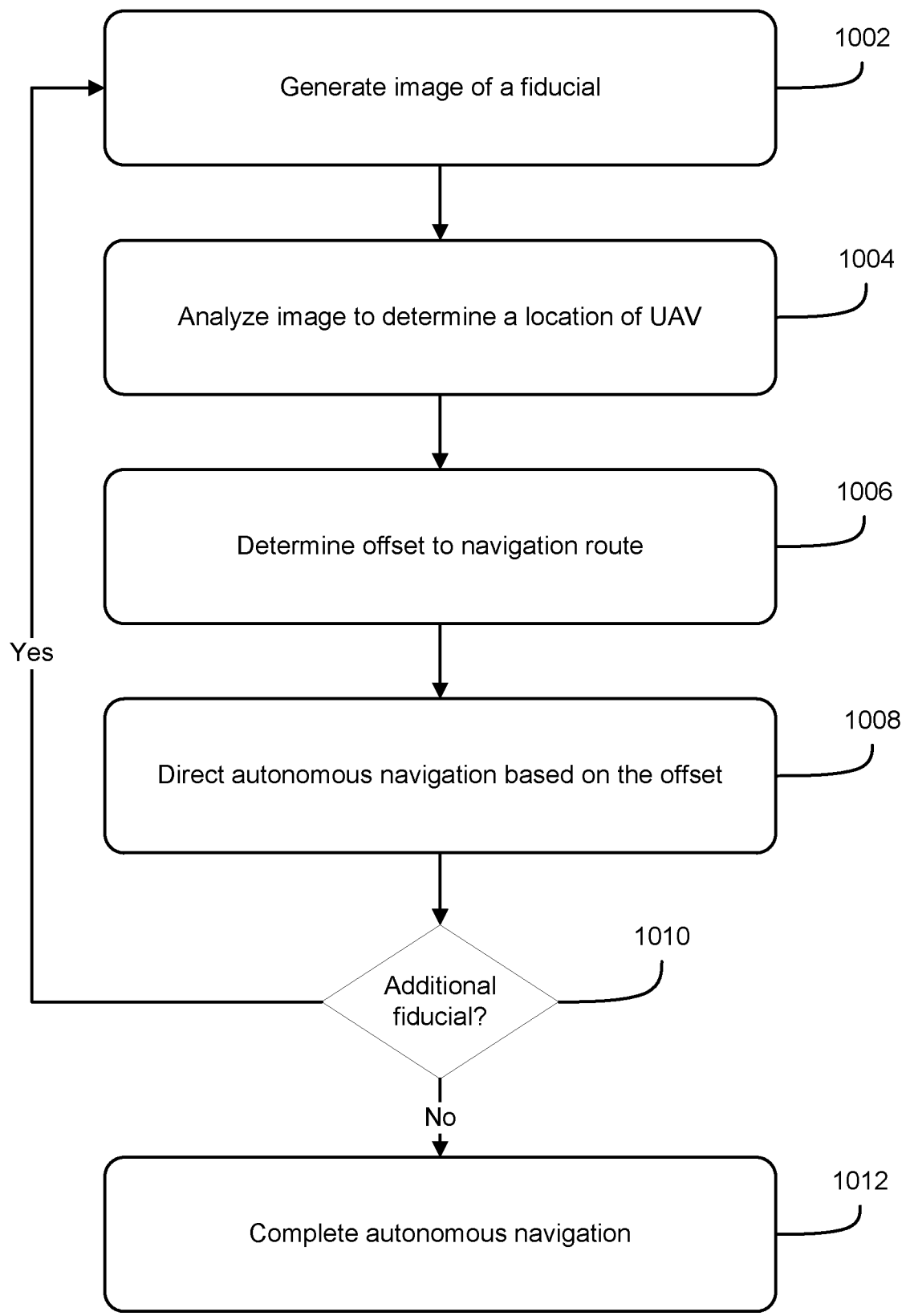
FIG. 10 illustrates an example flow for using multiple fiducials for an autonomous operation, according to embodiments.

Turning to FIGS. 8-10, those figures illustrate example flows for facilitating an autonomous navigation (and similarly other autonomous operations) of a UAV (and similarly other unmanned vehicles) based on fiducials. FIG. 8 illustrates an example flow for deploying the UAV and facilitating the autonomous navigation. In comparison, FIG. 9 illustrates an example flow for updating a navigation state of the UAV based on a fiducial. FIG. 10 illustrates an example flow for using multiple fiducials for navigating the UAV. Some of the operations of the example flows of FIGS. 8-10 may be similar. Such similarities are not repeated herein in the interest of clarity of explanation.

Further, in the illustrative operations, some of the operations or functions may be embodied in, and fully or partially automated by, modules executed by one or more processors. In the interest of clarity of explanation, a UAV (e.g., a computer system thereof) may be described as performing these operations. Nonetheless, a central station (or a computer system thereof) may also perform some of these operations or other operations. Other or a combination of other computing devices and modules may be additionally or alternatively used. Also, while the operations are illustrated in a particular order, it should be understood that no particular order is necessary and that one or more operations may be omitted, skipped, and/or reordered.

The example flow of FIG. 8 may start at operation 802, where fiducials may be installed at different locations. For example, fiducials may be distributed across an area and affixed to various locations, including ground locations, building roofs, and/or tops of other structures. Each fiducial may include a unique identifier of the fiducial.

At operation 804, data about the fiducials may be maintained. For example, the central station may generate and store a map of the fiducials. The map may show the fiducials (e.g., the unique identifiers and/or images of the fiducials) and the respective locations. The map may also show if a fiducial may be used or if the fiducial has been discredited. This information may be based on images of the fiducials received from multiple UAVs and/or based on scheduled visual inspections of the fiducials.

At operation 806, a navigation route may be generated. For example, an order for an item may be received. The UAV may be deployed to deliver the item from a source to a destination. The central station and/or the UAV may generate the navigation route as a navigation path over time between the source and destination. The navigation route may also identify fiducials based on the navigation path and the map. The fiducials may be used as waypoints for ground truth and velocity checks along the navigation route.

At operation 808, an image of a fiducial may be generated. For example, the UAV may include an imaging device. The imaging device may generate the image. Different techniques may be used to control the imaging device and the image generation. In one technique, the imaging device may generate images at time intervals (e.g., every five minutes or some other intervals). The time intervals may be a function of the item to be delivered. For instance, the more valuable the item may be (e.g., monetary value, delivery urgency value, etc.), the shorter the time intervals may become. For high valued items, the images may be continuously generated (e.g., resulting in a video). That time intervals may also or alternatively be a function of navigation offsets. For instance, if the fiducial is expected to be in the field of view, but an image indicates otherwise, the time intervals may be shortened such that the UAV (or the computer system thereof) may more actively or frequently search for the fiducials. In another technique, the image may be generated based on the navigation route. In particular, the navigation route may specify a location of the fiducial. Based on navigation data (e.g., GPS data), the UAV (or computer system thereof) may determine that the fiducial should have entered the field of view of the imaging device. The image may be generated accordingly.

At operation 810, ground truth may be determined based on the image. For example, the image may be analyzed locally at the UAV or remotely at the central station to detect the fiducial. If detected, the fiducial's location and dimensions may be determined. A geometric reconstruction may be applied to derive the actual location of the UAV. A second image of the fiducial may be similarly generated at a second time and analyzed to further confirm (e.g., increase the accuracy) the actual location and determine the velocity. This analysis process may be repeated over several images of the fiducial. On the other hand, if the fiducial is not detected in the image, different corrective actions may be performed. One corrective action may include determining whether the image identifies another fiducial and, if so, deriving the ground truth and velocity based on this other fiducial. Another corrective action may include increasing the frequency of taking images until a fiducial is identified, allowing the ground truth and velocity analysis to be performed. Yet another corrective action may include landing the UAV, attempting to return to a home base, or maintaining course if no fiducial is detected after some time period or a certain number of analyzed images.

At operation 812, the autonomous navigation of the UAV may be directed based on the ground truth and the velocity. In particular, this information may be used in different ways. In an example, the UAV (or computer system thereof) may update a navigation state of the UAV with the ground truth and velocity. In another example, the UAV may compute offsets between the ground truth and velocity and the navigation data (e.g., the GPS data or the navigation state generated based on the GPS data. The offsets may be used to correct the navigation data. In yet another example, the UAV may compensate the navigation route based on the ground truth and velocity by correcting any resulting time and/or distance offsets. In a further example, the UAV may rely on the fiducial (e.g. the ground truth and velocity) to perform the autonomous navigation independently of the other navigation data. In this example, the UAV may continuously (or at short predefined time intervals) generate and analyze images of the fiducial to determine the ground truth and velocity over time and accordingly update the navigation state.

Turning to FIG. 9, the figure illustrates an example flow for analyzing images of a fiducial to determine ground truth and velocity of the UAV. The UAV (e.g., the computer system thereof) is illustrated as performing the operations of FIG. 9. Nonetheless, the UAV may transmit the images to the central station. In response, the central station may perform some of the operations (determining the location and dimensions of the fiducial and/or the ground truth and velocity of the UAV) and return the resulting data to the UAV.

The example flow of FIG. 9 may start at operation 902, where an image of a fiducial may be accessed. For example, the imaging device of the UAV may generate the image. The computer system of the UAV may receive the generated image (or image data) from the imaging device.

At operation 904, a location and a dimension of the fiducial may be determined from the image. For example, the fiducial may encode such information as a series of bits using a certain visual pattern (e.g., a black and white grid, where each tile in the grid may represent a bit). The computer system may apply different imaging processing techniques (e.g., object recognition, pattern recognition, edge detection, etc.) to detect the fiducial and the encoded bits. The computer system may decode the detected bits to determine the location and dimension.

At operation 906, a location of the UAV may be determined based on a geometric reconstruction applied to the image. For example, relative distance, Y-plane angle, and X-plane angle between the UAV (e.g., the imaging device) and the fiducial may be determined from the image. The dimension of the UAV may provide a scale. By applying the scale, the actual location of the UAV may be determined from the relative distance, Y-plane angle, and X-plane angle.

At operation 908, a velocity of the UAV may be determined based on the image and a second image of the UAV. For example, the imaging device may generate a second image of the UAV at a second time. The location of the UAV at that second time may be computed as described in connection with operation 906. The difference between two locations of the UAV may represent a travelled distance. The velocity of the UAV may be derived from the travelled distance and the difference between the times when the two imaged were generated.

At operation 910, an offset to the navigation data of the UAV may be determined. For example, the navigation data may include GPS data indicating a latitude, longitude, and altitude (and velocity over time). The computed location of the UAV from the image of the fiducial may similarly include a true latitude, longitude, and altitude. As such, the data may be compared to detect a latitude offset, a longitude offset, and an altitude offset (and a velocity offset). If an offset is beyond an expected accuracy of the navigation data (e.g., of the GPS data), such navigation data may no longer be reliable. In such case, the UAV may no longer use the navigation data (e.g., the GPS data) for the autonomous navigation. Instead, the UAV may rely on the fiducial.

At operation 912, a navigation state of the UAV may be updated. For example, the navigation state may maintain the location and velocity of the UAV over time. This navigation state may be used to direct the autonomous navigation of the UAV. As such, the computer system of the UAV may update the navigation state with the true location and velocity derived from the fiducial.

Turning to FIG. 10, the figure illustrates an example flow for using multiple fiducials associated with a navigation route. In particular, the navigation route may specify the fiducials that the UAV may be expected to encounter along the navigation route. The UAV may use these fiducials as waypoints to check the ground truth and position and perform various adjustments related to the navigation route.

The example flow of FIG. 10 may start at operation 1002, where an image of a fiducial may be generated. For example, the image may be generated when the fiducial enters or is expected to be within the field of view of the imaging device of the UAV.

At operation 1004, the image may be analyzed to determine the location of the UAV (e.g., the ground truth). A second image may be similarly analyzed to further determine the velocity of the UAV.

At operation 1006, an offset to the navigation route may be determined. The navigation route may define a navigation path over time. The location and velocity of the UAV may be compared to this navigation path to compute a temporal and/or spatial offset.

At operation 1008, the autonomous navigation of the UAV may be directed based on the offset. For example, the navigation route may be compensated based on the offset. In particular, the navigation path may be changed to eliminate the offset and/or the velocity of the UAV may be adjusted such that the UAV may re-align with the navigation path.

At operation 1010, a determination is made as to whether an additional fiducial may be expected along the navigation route. In an example, the navigation route may identify the next fiducial that the UAV should encounter. In another example, the current fiducial may provide information about the next fiducial. For example, the current fiducial may encode the location, distance, identifier, dimensions, and/or direction to the next fiducial. In both examples, if the additional fiducial is expected, the UAV may use information about the next fiducial to continue the autonomous navigation towards that next fiducial. Accordingly, operation 1002 may follow operation 1010, where an image of the next fiducial may be generated and analyzed. Otherwise, operation 1012 may follow operation 1010.

At operation 1012, the autonomous navigation may be completed. For example, the UAV may fly any remaining leg of the navigation route using navigation data (e.g., GPS data) and/or data derived from the image of the fiducial.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a fiducial configured to encode a location and a dimension of the fiducial; and
   an unmanned aerial vehicle (UAV) comprising:
      an imaging device configured to generate a plurality of images of the fiducial; and
      a computer system configured to:
         direct an autonomous flight of the UAV based at least in part on a navigation state of the UAV;
         determine the location and the dimension of the fiducial based at least in part on a first image of the fiducial, the first image generated by the imaging device at a first time;
         estimate a first location of the UAV at the first time based at least in part on the location and the dimension of the fiducial;
         estimate a second location of the UAV at a second time based at least in part on a second image of the fiducial, the second image generated by the imaging device at the second time; and
         update the navigation state of the UAV based at least in part on the first location and the second location.

2. The system of claim 1, wherein the computer system is further configured to:
   determine a travelled distance based at least in part on the first location and the second location; and
   determine a velocity of the UAV based at least in part on the travelled distance, the first time, and second time, wherein the navigation state is further updated based at least in part on the velocity.

3. The system of claim 1, wherein the location and the dimension of the fiducial are encoded as information that comprises a latitude, a longitude, and an altitude of the fiducial, and wherein estimating the first location comprises:
   determining a scale of the fiducial relative to the first image based at least in part on the information;
   determining a relative distance and a relative angle between the UAV and the fiducial based at least in part on the scale and the first image; and
   determining a first latitude, a first longitude, and a first altitude of the UAV based at least in part on the relative distance, the relative angle, and the latitude, the longitude, and the altitude of the fiducial.

4. The system of claim 1, wherein the autonomous flight of the UAV is further directed based at least in part on a navigation route that identifies an expected time for the fiducial to enter a field of view of the imaging device, and wherein the computer system is further configured to:
   determine a time offset based at least in part on the first time and the expected time; and
   determine a compensation to at least one of the UAV or the navigation route based at least in part on the time offset.

5. The system of claim 4, wherein the computer system is further configured to determine a velocity offset based at least in part on the time offset, and wherein the compensation comprises a change to a velocity of the UAV based at least in part on the time offset.

6. The system of claim 4, wherein the computer system is further configured to determine a distance offset based at least in part on the time offset, and wherein the compensation comprises a change to the navigation route based at least in part on the distance offset.

7. The system of claim 1, wherein the UAV is configured to deliver an item, wherein a time interval between the first time and the second time is based at least in part on the item.

8. The system of claim 1, wherein the autonomous flight of the UAV is further directed based at least in part on a navigation route that identifies an expected time for the fiducial to enter a field of view of the imaging device, wherein a time interval between the first time and the second time is based at least in part on a determination that the fiducial is not detected in an image generated at the expected time.

9. The system of claim 1, wherein the autonomous flight of the UAV is further directed based at least in part on a navigation route that identifies the location of the fiducial, wherein a time interval between the first time and the second time is based at least in part on a determination that the fiducial should have entered the field of view of the imaging device, wherein the determination is based at least in part on navigation data of a navigation sensor of the UAV and on the location of the fiducial identified in the navigation route.

10. A method implemented by a computer system, the method comprising:
    directing an autonomous navigation of an unmanned vehicle based at least in part on a navigation state of the unmanned vehicle;
    determining a location and a dimension of a fiducial based at least in part on first image data of the fiducial, the location and the dimension encoded by the fiducial, the first image data generated based at least in part on an optical sensor of the unmanned vehicle at a first time;
    estimating a first location of the unmanned vehicle at the first time based at least in part on the location and the dimension of the fiducial;
    estimating a second location of the unmanned vehicle at a second time based at least in part on second image data of the fiducial, the second image data generated based at least in part on the optical sensor at the second time; and
    updating the navigation state of the unmanned vehicle based at least in part on the first location and the second location.

11. The method of claim 10, wherein the first location of the unmanned vehicle comprises a first latitude, a first longitude, and a first altitude, wherein the autonomous navigation of the unmanned vehicle is further directed based at least in part on navigation data of a navigation sensor of the unmanned vehicle, wherein the navigation data comprises a second latitude, a second longitude, and a second altitude.

12. The method of claim 11, further comprising determining a navigation offset between the first location and the navigation data, wherein the navigation offset comprises at least one of a latitude offset, a longitude offset, and an altitude offset, and wherein the navigation state is updated to include the first location based at least in part on the navigation offset.

13. The method of claim 12, further comprising determining that the navigation data should no longer be used for the autonomous navigation based at least in part on the navigation offset and an accuracy of the navigation sensor.

14. The method of claim 10, wherein the autonomous navigation of the unmanned vehicle is further directed based at least in part on navigation data of a navigation sensor of the unmanned vehicle, and further comprising:
 determining a velocity of the unmanned vehicle based at least in part on the first location, the second location, the first time, and the second time; and
 determining a velocity offset based at least in part on the velocity and the navigation data.

15. The method of claim 14, wherein the navigation state is updated to include the second location based at least in part on the velocity offset.

16. A computer system associated with an unmanned vehicle that comprises an optical sensor, the compute system comprising:
 one or more processors; and
 one or more computer-readable storage media comprising instructions that, upon execution by the one or more processors, cause the computer system to:
  direct an autonomous navigation of the unmanned vehicle based at least in part on a navigation state of the unmanned vehicle;
  determine a location and a dimension of a fiducial based at least in part on first image data of the fiducial, the location and the dimension encoded by the fiducial, the first image data generated based at least in part on the optical sensor of the unmanned vehicle at a first time;
  estimate a first location of the unmanned vehicle at the first time based at least in part on the location and the dimension of the fiducial;
  estimate a second location of the unmanned vehicle at a second time based at least in part on second image data of the fiducial, the second image data generated based at least in part on the optical sensor at the second time; and
  update the navigation state of the unmanned vehicle based at least in part on the first location and the second location.

17. The computer system of claim 16, wherein the execution of the instructions further causes the computer system to:
 determine, based at least in part on route information, that a second fiducial is also in a field of view of the optical sensor;
 generate a plurality of second images of the second fiducial; and
 further update the navigation state based at least in part the plurality of second images.

18. The computer system of claim 16, wherein the autonomous navigation is based at least in part on a route that identifies the fiducial and a second fiducial, and wherein the execution of the instructions further causes the computer system to:
 determine that the fiducial is out of a field of view of the optical sensor;
 maintain, by using a navigation sensor of the unmanned vehicle, the navigation state based at least in part on the fiducial being out of the field of view;
 direct the autonomous navigation based at least in part on the route and based at least in part on the navigation state being maintained.

19. The computer system of claim 18, wherein the execution of the instructions further causes the computer system to:
 determine that the second fiducial is within the field of view of the optical sensor;
 determine an updated location of the unmanned vehicle based at least in part on image data of the second fiducial to; and
 update the navigation state based at least in part on the updated location.

20. The computer system of claim 16, wherein the execution of the instructions further causes the computer system to:
 store route information that indicates a route of the unmanned vehicle and an expected time of the fiducial entering a field of view of the unmanned vehicle, wherein the autonomous navigation is based at least in part on the route, and wherein the first location is estimated further based at least in part on the route and the expected time.

* * * * *